United States Patent [19]
Ittycheriah et al.

[11] Patent Number: 5,937,383
[45] Date of Patent: Aug. 10, 1999

[54] APPARATUS AND METHODS FOR SPEECH RECOGNITION INCLUDING INDIVIDUAL OR SPEAKER CLASS DEPENDENT DECODING HISTORY CACHES FOR FAST WORD ACCEPTANCE OR REJECTION

[75] Inventors: Abraham Poovakunnel Ittycheriah; Stephane Herman Maes, both of Danbury, Conn.

[73] Assignee: International Business Machines Corporation, Armonk, N.Y.

[21] Appl. No.: 08/869,025

[22] Filed: Jun. 4, 1997

Related U.S. Application Data

[60] Provisional application No. 60/011,058, Feb. 2, 1996.

[51] Int. Cl.$^6$ ................................................. G10L 9/06
[52] U.S. Cl. ................................... 704/255; 704/242
[58] Field of Search .................................. 704/255, 275, 704/270, 239, 240, 241, 242, 236

[56] References Cited

U.S. PATENT DOCUMENTS

| | | | |
|---|---|---|---|
| 4,783,803 | 11/1988 | Baker et al. | 704/241 |
| 4,866,778 | 9/1989 | Baker | 704/242 |
| 4,972,485 | 11/1990 | Dautrich et al. | 704/242 |
| 5,218,668 | 6/1993 | Higgins et al. | 704/200 |
| 5,384,892 | 1/1995 | Strong | 704/243 |
| 5,677,991 | 10/1997 | Hsu et al. | 704/255 |
| 5,754,978 | 5/1998 | Perez-Mendez et al. | 704/255 |
| 5,758,319 | 5/1998 | Knittle | 704/251 |
| 5,794,196 | 8/1998 | Yegnanarayanan et al. | 704/255 |

*Primary Examiner*—Richemond Dorvil

[57] ABSTRACT

A method and an apparatus are provided for performing speech recognition on speech segments frequently input by a user. The method and the apparatus include use of keyword scoring in connection with a speech recognition vocabulary, a temporary score, and a predetermined margin to determine an appropriate output as being representative of the input speech segment.

25 Claims, 1 Drawing Sheet

APPARATUS AND METHODS FOR SPEECH RECOGNITION INCLUDING INDIVIDUAL OR SPEAKER CLASS DEPENDENT DECODING HISTORY CACHES FOR FAST WORD ACCEPTANCE OR REJECTION

This application is based on provisional patent application Ser. No. 60/011,058, filed Feb. 2, 1996.

BACKGROUND OF THE INVENTION

The present invention relates to speech recognition systems and, more particularly, to apparatus and methods for performing fast word acceptance or rejection using decoding history caches.

Speech recognition is an emerging technology. More and more often it is replacing classical data entry or order taking, which typically require filling out of forms, typing or interacting with human operators. Typically an initial step in a computerized speech recognition system involves the computation of a set of acoustic features (feature vector) from sampled speech. The sampled speech may be provided by a user of the system via an audio-to-electrical transducer, such as a microphone, and converted from an analog representation to a digital representation before sampling. Typically, a classical acoustic front-end (processor) is employed to compute the acoustic features from the sampled speech. The acoustic features are then submitted to a speech recognition engine where the utterances are recognized thereby generating a decoded or recognized script which is representative of the sampled input speech.

Classical speech recognition systems typically compare the likelihood of all possible word hypotheses or sequences of word hypotheses and select the most probable hypotheses as the recognized script based on acoustic and language modeling scores. This process is referred to as a detailed match search. When a comparison of all possible hypotheses is impractical, which is often the case, the set of possible hypotheses compared is limited by a process known as the fast match search which is performed to rapidly limit the set of possible hypotheses by eliminating, after a quick scoring, hypotheses falling too far behind the top ranking hypotheses.

Unfortunately, for high volume speech recognition applications, for example, a corporate name voice dialer, the amount of hypotheses to consider for known detailed match and fast match searches is still prohibitively large.

SUMMARY OF THE INVENTION

It is an object of the present invention to provide apparatus and methods for rapidly limiting the amount of hypotheses to search based on the history of previous use of a speech recognition system by a user.

It is another object of the present invention to define a cache database which stores keywords (vocabulary such as names and/or commands) frequently used by a user, as well as score information attributed to the keywords.

In one aspect of the present invention, a method for performing speech recognition on speech segments frequently input by a user comprises the steps of: inputting at least one keyword spoken by the user; decoding the at least one keyword by scoring the at least one keyword against a speech recognition vocabulary to generate a decoded keyword and at least one score for the decoded keyword; storing the decoded keyword and the at least one score; inputting a speech segment spoken by the user; comparing the input speech segment to the decoded keyword in order to generate a temporary score; and comparing the temporary score against the at least one stored score and if the temporary score is one of within a predetermined margin of, equivalent to, and larger than the at least one stored score, then the decoded keyword is output as being representative of the input speech segment, else the input speech segment is scored against the speech recognition vocabulary to generate a second decoded keyword and at least one score for the second decoded keyword. The method also preferably includes the step of storing the second decoded keyword and the at least one score associated therewith.

Advantageously, in this manner, keywords and scores associated therewith are stored in a decoding history cache in order to reduce the amount of hypotheses to consider in the decoding process. Further, the term "keyword" is generally defined to include such words and phrases as names, commands, and sentences which include both functional and non-functional words.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
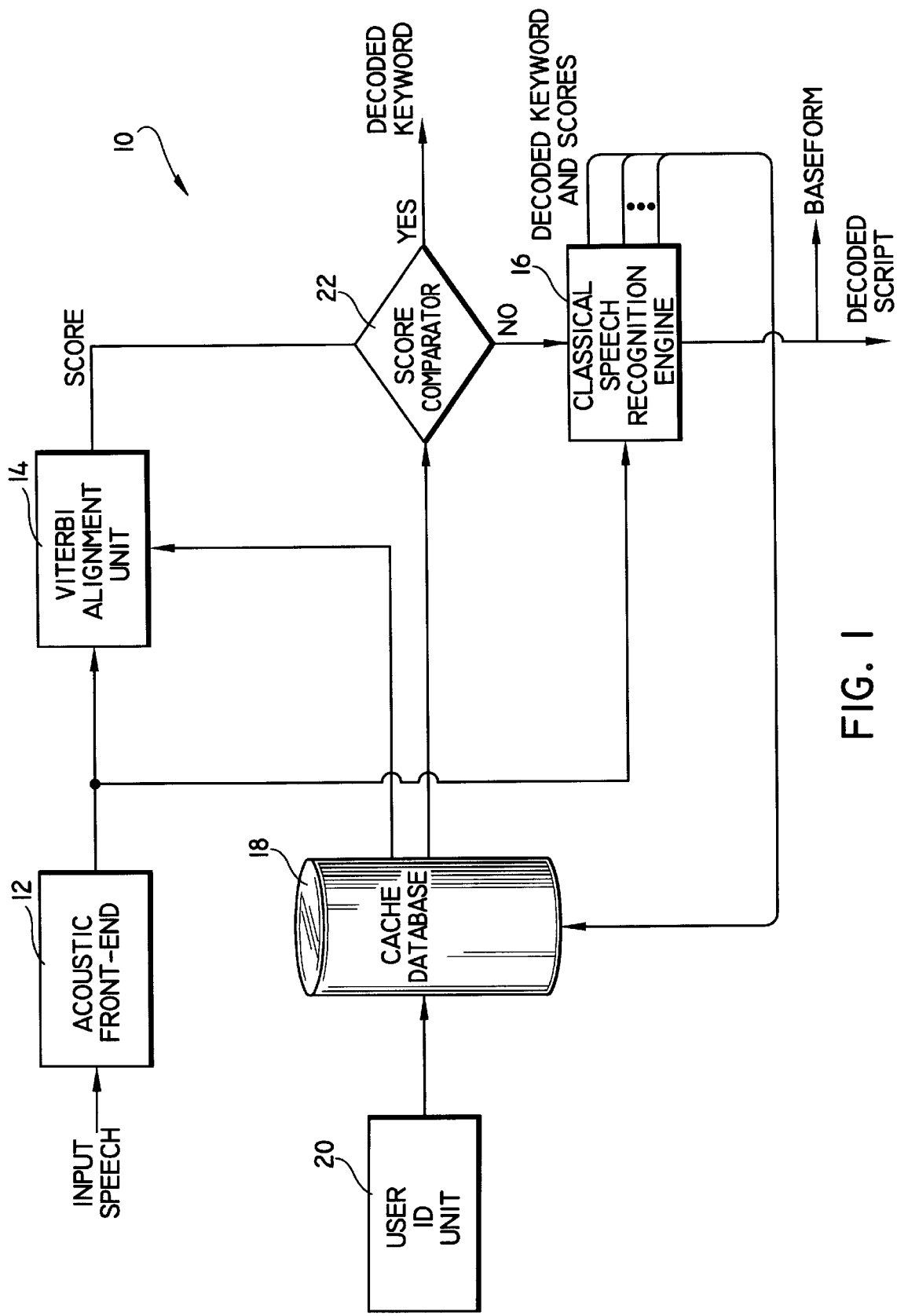
FIG. 1 is a block diagram illustrating one embodiment of a speech recognition system employing a cache database according to the present invention.

In a speech recognition application such as voice dialing (an operation wherein a name of a party is input, recognized, matched with the telephone number associated with that party and then automatically dialed), each name utterance input by the system users must typically be compared with baseforms for all the words of the vocabulary. However, the present invention recognizes that, most of the time, a user interacts regularly with a limited amount of people. Therefore, due in part to such a fact, the present invention provides a unique manner of building and implementing a cache database for each user within a speech recognition environment. Such a cache implemented in a voice dialing application preferably contains the names of the latest persons queried by a particular user. This concept may be extended to include other forms of vocabulary in the cache such as, for example, commands. In the case of a voice controlled navigator, such a unique cache database may be built and implemented to store recent command history as well as to use the context to load the related command for execution by the navigation system. Given the description of the invention provided herein, it is to be appreciated that one of ordinary skill in the art will be able to contemplate numerous other applications for employing the principles of the present invention.

Generally, the present invention provides for storing data in a cache and utilizing such data in order to quickly accept or reject keywords, i.e., names, commands or sentences, without impacting the overall recognition process and, therefore, without adversely affecting recognition performance. Such a cache database formed according to the invention contains the word history of a keyword (name, command or sentence) as well as the likelihood (score) obtained when the word was added to the cache. Further, whenever an input speech segment is uttered, the keywords of the cache are checked first before the segment is subjected to a classical speech recognition engine. If it is determined, as will be explained, that a keyword in the cache presents the highest likelihood of being the closest match to the speech segment input by the user, then that keyword is output as the recognized script (name, command or sentence). In other words, you will try to align the baseforms of the words stored in the cache and get a score for all these comparisons. The scores are compared with what is stored in the cache, to decide if one hypothesis is acceptable or not. Preferably, it is required that the score be within a margin of the stored score and that it is among the top ranking scores among all the words in the cache. If no word in the cache is determined to be the closest match, then the input speech segment is subjected to the classical speech recognition engine. Subsequently, the decoded word(s) resulting from the recognition preformed by the engine is then preferably added to the cache along with associated scores. In this manner, not only is the overall speech recognition system not impacted, but performance is substantially enhanced due to the implementation of such cache features.

However, it is to be understood that the likelihoods compared to make the acceptance/rejection determination are only comparable if associated with the same speaker. That is, the likelihood associated with the keyword input to the system by a speaker must be compared to likelihoods of words previously input to the cache by the same speaker. Thus, such a condition implies that the speakers identity be known. As will be explained, such identification may preferably be achieved by text-independent speaker identification or by speaker-independent speaker classification, as will be explained; however, any other conventional method for identifying the speaker may be employed, for instance, by keying in a password or by a similar non-speech based identification process.

Referring now to FIG. 1, preferred apparatus 10 for implementing the invention is shown. Specifically, an acoustic front-end 12 is operatively coupled to a Viterbi alignment unit 14, as well as to a classical speech recognition engine 16. It is to be understood that the acoustic front-end 12 is a processor which extracts acoustic features from a sample of input speech provided thereto. The acoustic front-end 12 may be a conventional acoustic front-end and may generate conventional acoustic feature vectors such as, for example, mel cepstral vectors. The specific feature extraction process employed is not critical to the invention. Next, a cache database 18 is provided which is responsive to a user identification unit 20, which will be explained, and which is operatively coupled to a score comparator 22, the Viterbi alignment unit 14 and the classical speech recognition engine 16. Given the above description of component interconnection, an explanation of the operation of such preferred apparatus will follow below.

The functions performed by the Viterbi alignment unit 14 are similar to those performed by the classical speech recognition engine 16. That is, the acoustic features extracted in acoustic front-end 12 are subjected to a probabilistic pattern matching technique using Hidden Markov models (HMMs) in both the alignment unit 14 and the engine 16. A key difference, as will be explained, is that the Viterbi alignment unit 14 is only concerned with the database of words stored in the cache database 18, while the engine 16 is concerned with a larger scale language database (vocabulary) associated therewith. It is to be understood that Hidden Markov modeling provides different scores for different hypotheses. Examples of such scores are rank (i.e., the ranking of a decoded word), fast match scores (i.e., the likelihoods of a simplified scheme), detailed match scores (i.e., the likelihoods of a detailed scheme), language modeling scores (i.e., probability according to a language model) and/or any combination of these scores.

Specifically, when a user uses the system, his or her identify is determined by user ID unit 20. This may be accomplished by one of several methods. For instance, the user may enter a personal identification number (PIN) or a password at a keypad, keyboard or any other device known in the art for accepting such identifying indicia. Still further, the identity of the speaker may be determined using automatic speaker identification methods, for example, as disclosed in U.S. Ser. No. 08/788,471. However, it is to be understood that the method for identifying the speaker employed by unit 20 is not critical to the invention. The important function served by the user ID unit 20 is to permit the cache 18 to know which portion of its database corresponds to a particular speaker.

It is to be understood that initially the cache database 18 does not have any keywords or corresponding scores stored therein, that is, until a particular user inputs certain names or commands. When the user first inputs a name or a command, the acoustic front-end 12 generates a set of acoustic features which are then provided to the classical speech recognition engine 16. The word is decoded in accordance with the Hidden Markov models and the decoded word, along with the different scores (discussed above) associated with the word, are stored in the cache database 18 preferably partitioned for that particular user. It is to be understood that rather than a large cache database partitioned for each system user, individual cache databases may be formed for each user.

Next, when the same user enters another speech segment, the following operation is performed. First, each decoded keyword in the cache database 18 corresponding to the same user is considered as a hypothesis with respect to the newly entered speech segment. This evaluation is done by the Viterbi alignment unit 14. The resulting scores from such comparison are then presented to the score comparator 22. Also, the scores which were previously stored in the cache database 18 pertaining to the particular user are presented to the score comparator 22 wherein the scores from unit 14 are compared to the stored scores. If the new scores from unit 14 are within a margin of, the same as, or larger than the stored scores corresponding to one of the decoded keywords in the cache, then that keyword is accepted and is output from the score comparator 22 as the decoded input speech segment. However, if the new scores are not within a margin or, or are less than any of the stored scores, then the decoded keywords in the cache are rejected and the input speech segment is subjected to the complete vocabulary of the classical speech recognition engine 16 whereby a decoded script is generated.

After the input speech segment is decoded by the engine 16, the decoded word and associated scores are provided to the cache database 18 where they are stored as a new keyword and related scores for that particular user. In this way, the cache stores the latest and most frequently used keywords that a user may input to the system. In the voice dialing phone system application, this will preferably include the latest and most frequently called names. In the voice controlled navigation application, this will preferably include the latest and most frequently input commands. It is to be appreciated that the output of the comparator 22 (decoded keyword) and the output of the engine 16 (decoded script) may be connected to the actual phone system or navigation system such that the phone or navigation systems are responsive to the decoded keyword or script and thus perform their respective automatic functions (i.e., dialing or navigating). As mentioned, one skilled in the art will contemplate other uses for the novel principles disclosed herein.

It is possible to extend the concept of a cache database for storing keywords and scores to unknown speakers who have not enrolled in the speech recognition system and, therefore, have no prior history. This may be accomplished by vector quantization (VQ) clustering of the speakers as is disclosed in U.S. Ser. No. 08/787,031. Also, a new speaker may be associated with a class of speakers with similar characteristics to himself or herself wherein the acceptance or rejection decision is based on past history and an average previous likelihood associated with other speakers within that class. Such a speaker classification approach may be done completely speaker independently, in which case, the cache database may preferably be built common to all users in the class.

It is to be appreciated that the components of the embodiments described herein may be implemented in hardware, software or a combination thereof. Preferably, the preferred embodiment is implemented on an appropriately programmed general purpose digital computer.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for performing speech recognition on speech segments frequently input by a user, the method comprising the steps of:
   (a) inputting at least one keyword spoken by the user;
   (b) decoding the at least one keyword by scoring the at least one keyword against a speech recognition vocabulary to generate a decoded keyword and at least one score for the decoded keyword;
   (c) storing the decoded keyword and the at least one score;
   (d) inputting a speech segment spoken by the user;
   (e) comparing the input speech segment to the decoded keyword in order to generate a temporary score; and
   (f) comparing the temporary score against the at least one stored score and if the temporary score is one of within a predetermined margin of, equivalent to, and larger than the at least one stored score, then the decoded keyword is output as being representative of the input speech segment, else the input speech segment is scored against the speech recognition vocabulary to generate a second decoded keyword and at least one score for the second decoded keyword.

2. The method of claim 1, further comprising the step of storing the second decoded keyword and the at least one score associated therewith.

3. The method of claim 1, further comprising the step of storing the decoded keyword and scores associated therewith in accordance with a predetermined identity of the user.

4. The method of claim 3, further comprising the step of identifying the user via text-independent speaker identification.

5. The method of claim 3, further comprising the step of identifying the user via speaker-independent speaker classification.

6. The method of claim 1, wherein the at least one keyword is a name.

7. The method of claim 6, wherein said method is utilized in a name-based voice dialing phone system.

8. The method of claim 1, wherein the at least one keyword is a command.

9. The method of claim 8, wherein said method is utilized in a command-based voice controlled system.

10. The method of claim 1, wherein the at least one keyword is from a large vocabulary associated with a speech recognition system.

11. Apparatus for performing speech recognition on speech segments frequently input by a user, the apparatus comprising:
    means for inputting at least one keyword spoken by the user;
    means for decoding the at least one keyword by scoring the at least one keyword against a speech recognition vocabulary to generate a decoded keyword and at least one score for the decoded keyword;
    means for storing the decoded keyword and the at least one score;
    means for inputting a speech segment spoken by the user;
    means for comparing the input speech segment to the decoded keyword in order to generate a temporary score; and
    means for comparing the temporary score against the at least one stored score and if the temporary score is one of within a predetermined margin of, equivalent to, and larger than the at least one stored score, then the decoded keyword is output as being representative of the input speech segment, else the input speech segment is scored against the speech recognition vocabulary to generate a second decoded keyword and at least one score for the second decoded keyword.

12. The apparatus of claim 11, further comprising means for storing the second keyword and the at least one score associated therewith.

13. The apparatus of claim 11, further comprising means for storing the decoded keyword and scores associated therewith in accordance with a predetermined identity of the user.

14. The apparatus of claim 13, further comprising means for identifying the user via text-independent speaker identification.

15. The method of claim 13, further comprising means for identifying the user via speaker-independent speaker classification.

16. The apparatus of claim 11, wherein the at least one keyword is a name.

17. The apparatus of claim 16, wherein said apparatus is utilized in a name-based voice dialing phone system.

18. The apparatus of claim 11, wherein the at least one keyword is a command.

19. The apparatus of claim 18, wherein said apparatus is utilized in a command-based voice controlled system.

20. The apparatus of claim 11, wherein the at least one keyword is from a large vocabulary associated with a speech recognition system.

21. A system for recognizing keywords frequently input by a speaker, the system comprising:
    a speech recognition engine for decoding at least one keyword uttered by the speaker by scoring the at least one keyword against a speech recognition vocabulary to generate a decoded keyword and at least one score for the decoded keyword;

a cache database for storing the decoded keyword and the at least one score associated therewith in accordance with a predetermined identity of the speaker;

means for performing a Viterbi alignment process on an input speech segment uttered by the speaker wherein the input speech segment is compared to the decoded keyword to generate a temporary score; and a comparator for comparing the temporary score against the at least one stored score and if the temporary score is one of within a predetermined margin of, equivalent to, and larger than the at least one stored score, then the decoded keyword is output as being representative of the input speech segment, else the input speech segment is scored against the speech recognition vocabulary to generate a second decoded keyword and at least one score for the second decoded keyword.

22. The system of claim 21, wherein the second keyword and the at least one score associated therewith are stored in the cache database.

23. The system of claim 21, wherein the identity of the speaker is determined via text-independent speaker identification.

24. The system of claim 21, wherein the identity of the speaker is determined via speaker-independent speaker classification.

25. The system of claim 21, wherein the at least one keyword is one of a name, a command, and at least one word from a large vocabulary associated with a speech recognition system.

* * * * *